(12) United States Patent
Ohishi

(10) Patent No.: US 6,347,689 B1
(45) Date of Patent: Feb. 19, 2002

(54) ROLL BACK SEAL FOR DISC BRAKE

(75) Inventor: Rikimasa Ohishi, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/607,970

(22) Filed: Jun. 30, 2000

(51) Int. Cl.$^7$ .............................................. F16D 65/20
(52) U.S. Cl. ..................................... 188/72.4; 277/439
(58) Field of Search .............................. 188/72.4, 72.5; 277/438, 434

(56) References Cited

U.S. PATENT DOCUMENTS

| | | | | |
|---|---|---|---|---|
| 2,076,363 A | * | 4/1937 | Brunner | 277/439 |
| 2,294,976 A | * | 9/1942 | Gardiner | 277/439 |
| 2,335,069 A | * | 11/1943 | Loweke | 277/439 |
| 2,862,775 A | * | 12/1958 | Kupiec | 277/438 |
| 4,858,516 A | * | 8/1989 | Klein | 188/72.4 |
| 5,076,593 A | * | 12/1991 | Sullivan et al. | 277/205 |
| 5,480,163 A | * | 1/1996 | Miser et al. | 277/439 |
| 5,826,681 A | * | 10/1998 | Kubo et al. | 188/72.4 |
| 5,878,858 A | * | 3/1999 | Hein | 188/72.4 |
| 6,044,936 A | * | 4/2000 | Matsumoto et al. | 188/72.4 |

FOREIGN PATENT DOCUMENTS

| | | |
|---|---|---|
| JP | 1124437 | 8/1989 |
| JP | 10325432 | 12/1998 |
| JP | 11198795 | 7/1999 |
| JP | 11223230 | 8/1999 |
| JP | 11247911 | 9/1999 |
| JP | 11264430 | 9/1999 |
| JP | 11270600 | 10/1999 |

* cited by examiner

*Primary Examiner*—Matthew C. Graham
(74) *Attorney, Agent, or Firm*—Shinjyu Global IP Counselors, LLP

(57) ABSTRACT

A roll back seal is provided for a disc brake assembly that reliably returns a piston to a release position from a braking position with an extended sealing life. The disc brake assembly includes a caliper housing with at least one piston receiving opening, first and second friction members coupled to the caliper housing and one or more pistons movably coupled to the caliper housing to move one or both of the friction members. The first and second friction members form a rotor receiving slot. At least the first friction member is movably coupled to the caliper housing and at least one piston is movably coupled in at least one piston receiving opening of the caliper housing to move the first friction member between a release position and a braking position. The piston receiving opening has an annular side wall with an annular groove formed therein. The annular roll back seal is located in the annular groove between the caliper housing and the piston. The roll back seal has first and second annular end surfaces and inner and outer annular sealing surfaces extending between the first end surface and the second end surface. The second end surface has an annular recess formed therein.

46 Claims, 13 Drawing Sheets

ROLL BACK SEAL FOR DISC BRAKE

BACKGROUND OF THE INVENTION

1. Field of the Invention

This invention generally relates to a roll back seal for a disc brake. More specifically, the present invention relates a roll back seal that reliably returns a piston to a release position from a braking position with improved sealing characteristics over a longer service life.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the braking systems of bicycles. In particular, the braking power of the braking systems is constantly being increased.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. Of course, riders constantly desire better performance from disc braking systems, i.e., disc brake systems that have more braking power.

Conventionally, a disc brake is composed of a pair of brake pads that are movably mounted to a caliper housing. The brake pads are pressed against a disc or rotor that is fixed to the wheel to halt the rotation of the disc and thus the wheel. The brake pads are moved toward the disc hydraulically or mechanically such as by a cam mechanism. The hydraulic disc brake systems typically provide a high level of consistency in all types of weather and riding conditions.

In some hydraulic disc brakes, the seal rings are used to return the pistons from the braking position to the release position. These seal rings do not always reliably return the pistons to the release position which can cause rubbing between the friction pads and the rotor. Moreover, after extended use, these seal rings can become worn and/or fail, which can allow hydraulic fluid to leak from the disc brake assembly.

In view of the above, there exists a need for roll back seal for a disc brake assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a roll back seal that reliably returns a piston from a braking position to a release position.

Another object of the present invention is to provide a roll back seal with improved sealing characteristics over a longer service life.

Yet another object of the present invention is to provide a roll back seal that is relatively simple and inexpensive to manufacture and assemble.

The foregoing objects can basically be obtained by providing a disc brake assembly with an annular roll back seal. The disc brake assembly includes a caliper housing with a piston receiving opening, a first and a second friction member coupled to the caliper housing, a piston movably coupled in the piston receiving opening and the annular roll back seal. The piston receiving opening has an annular side wall with an annular groove formed therein. The first and second friction members form a rotor receiving slot between the first and second friction members. At least the first friction member is movably coupled to the caliper housing. The piston movably coupled in the piston receiving opening of the caliper housing moves the first friction member between a release position and a braking position. The annular roll back seal is located in the annular groove between the caliper housing and the piston. The roll back seal includes a first annular end surface, a second annular end surface, an inner annular sealing surface and an outer annular sealing surface. The second annular end surface is spaced from the first end surface. The inner annular sealing surface extends between the first end surface and the second end surface. The outer annular sealing surface extends between the first end surface and the second end surface. The second end surface has an annular recess formed therein.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
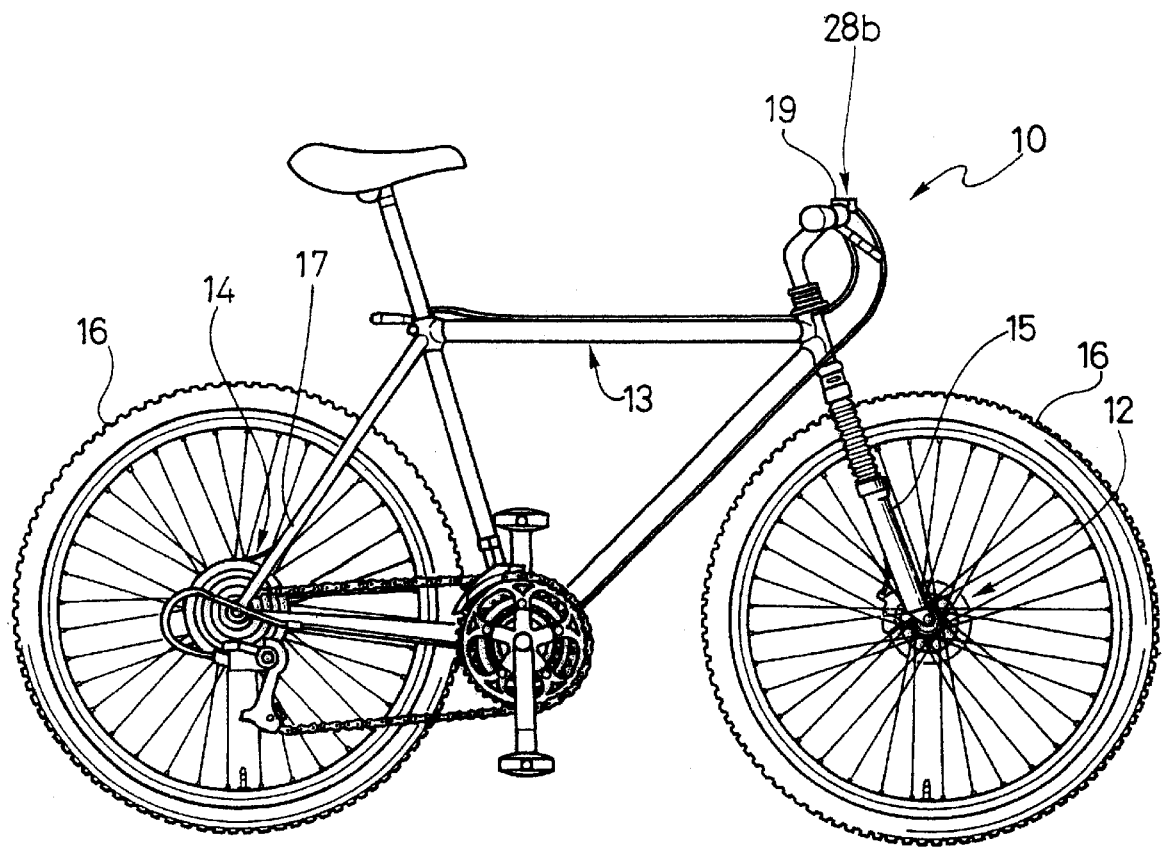
FIG. 1 is a side elevational view of a bicycle with a front disc brake assembly and a rear disc brake assembly in accordance with an embodiment of the present invention.

Referring initially to FIGS. 1–10, a bicycle 10 is illustrated with a front disc brake assembly 12 and a rear disc brake assembly 14 in accordance with a preferred embodiment of the present invention. Front and rear disc brake assemblies 12 and 14 are relatively conventional fluid operated disc brakes fixedly coupled to a frame 13. Therefore, disc brake assemblies 12 and 14 will not be discussed or illustrated in detail herein, except as modified by the preferred embodiments of the present invention, as discussed below.

Figure 2:
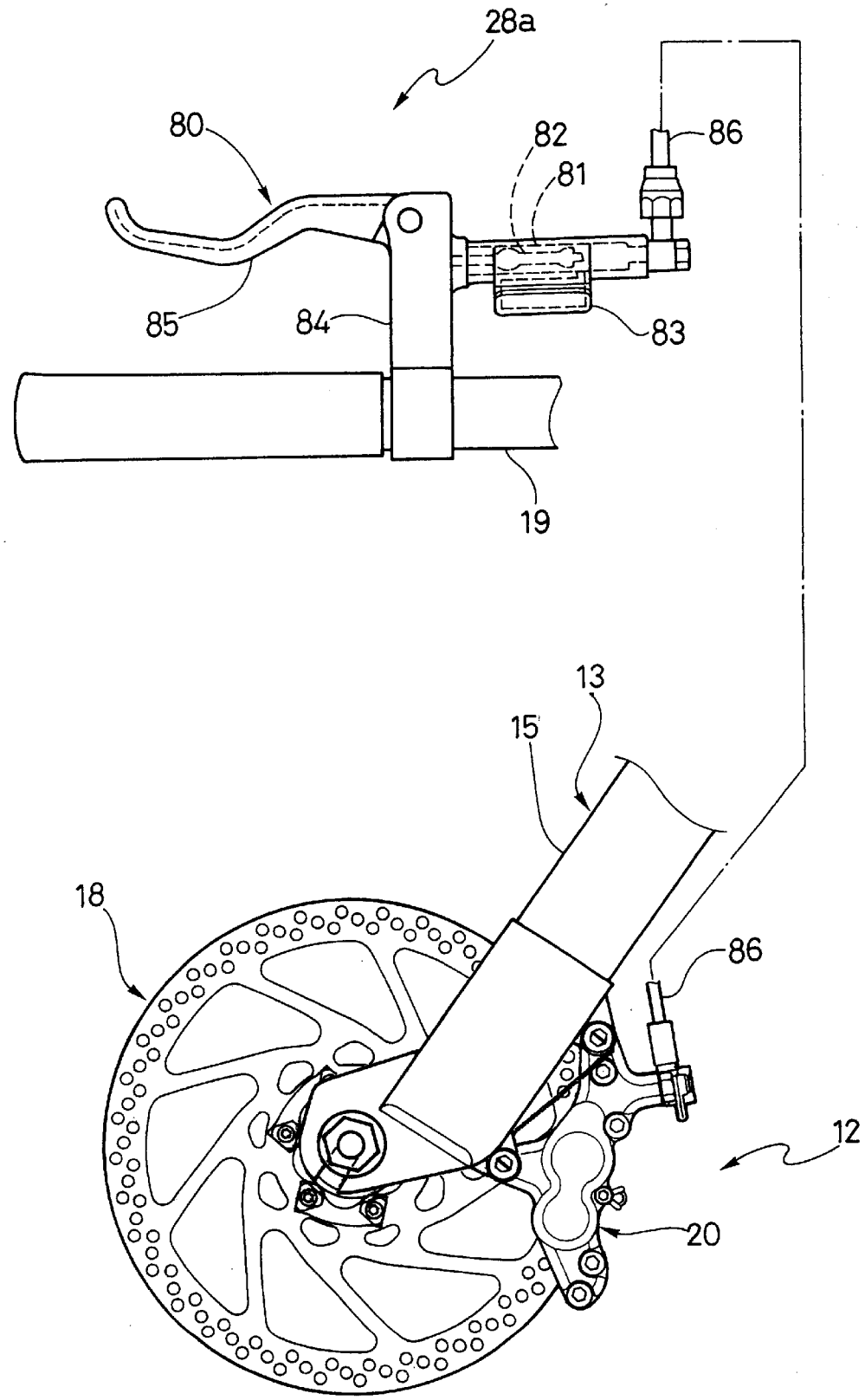
FIG. 2 is a schematic elevational view of the front disc brake assembly coupled to a front fork and a front disc brake operating mechanism of the bicycle illustrated in FIG. 1.
Figure 3:
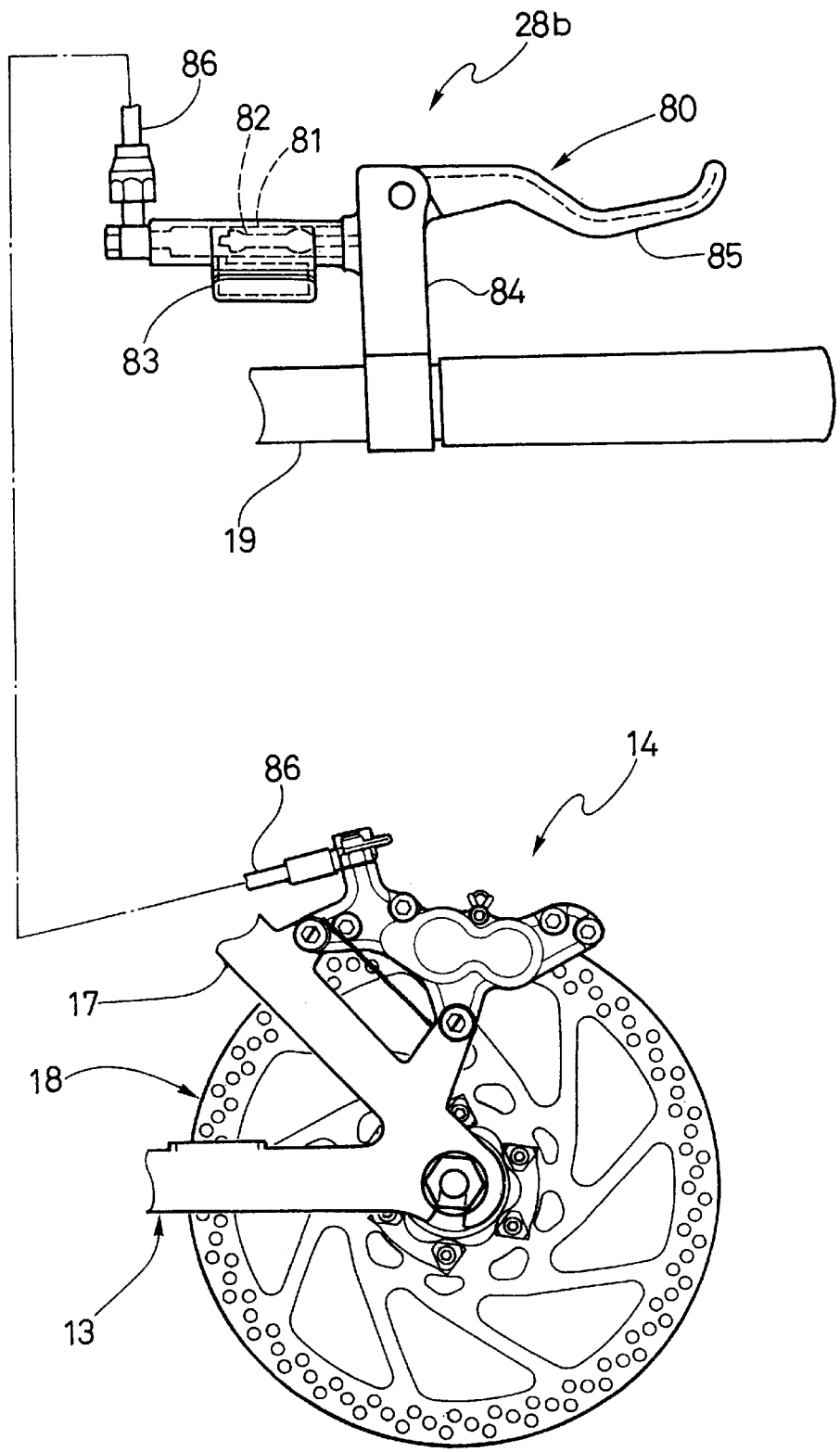
FIG. 3 is a schematic elevational view of the rear disc brake assembly coupled to a rear fork and a rear disc brake operating mechanism of the bicycle illustrated in FIG. 1.
Figure 4:
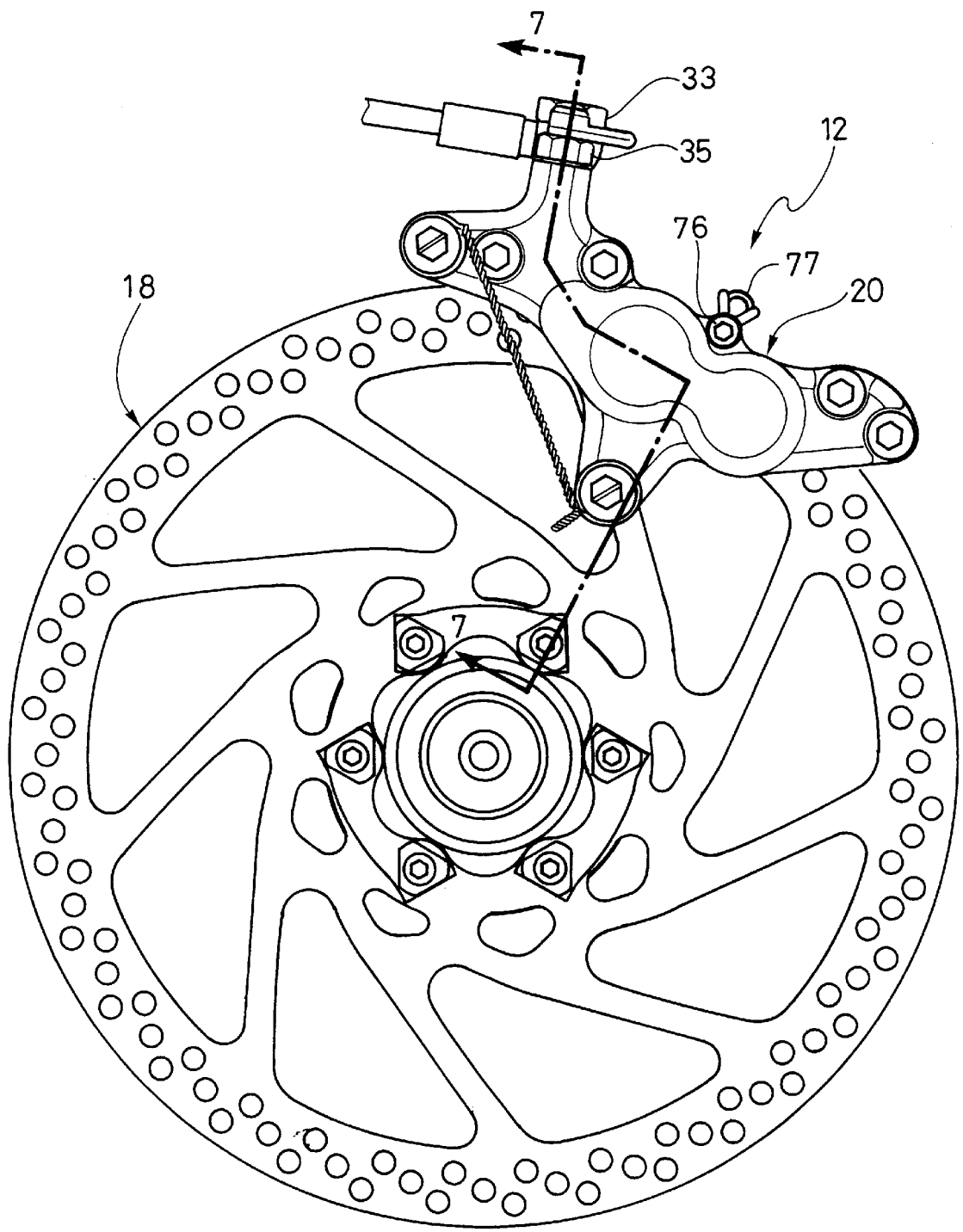
FIG. 4 is an enlarged, side elevational view of a portion of the front disc brake assembly illustrated in FIG. 2, with the bicycle frame removed for purposes of illustration.
Figure 5:
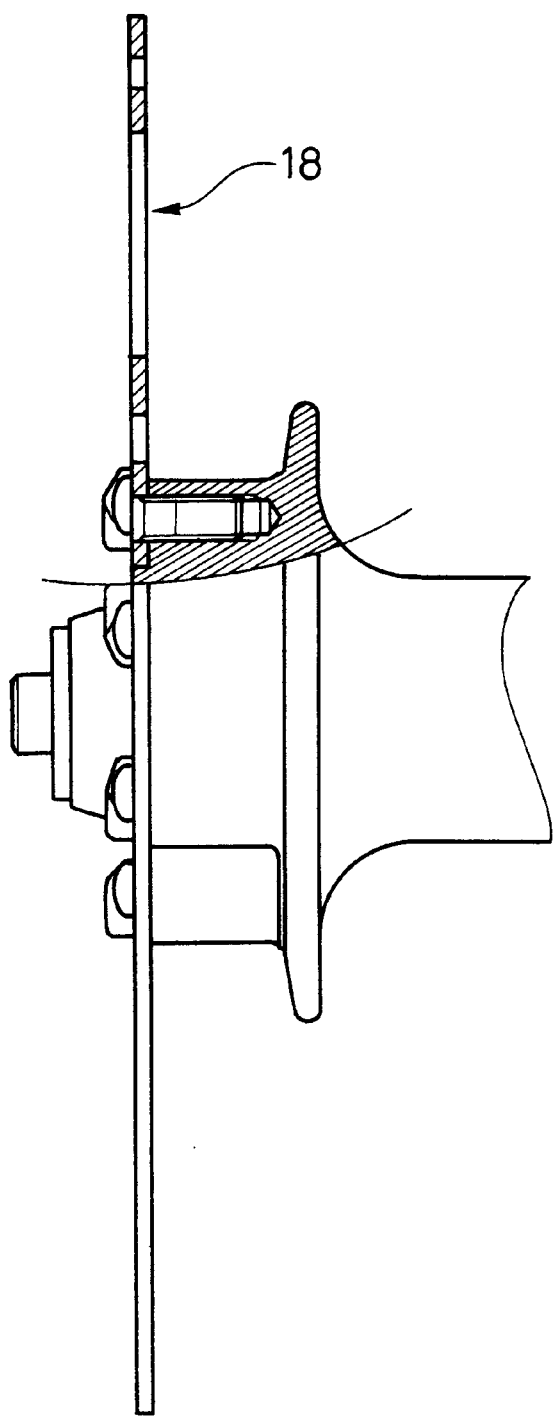
FIG. 5 is a partial cross-sectional view of a bicycle hub and disc brake rotor of one of the wheels of the bicycle illustrated in FIG. 1.

Specifically, front disc brake assembly 12 is fixedly coupled to a front fork 15 of frame 13, and rear disc brake assembly 14 is fixedly coupled to rear fork 17 of frame 13, as best seen in FIGS. 2 and 3. Frame 13 includes a handle bar 19 mounted to front fork 15 to steer the bicycle 10. Bicycle 10 includes a pair of wheels 16 rotatably coupled to the bicycle frame 13. One wheel 16 is coupled to front fork 15, and one wheel 16 is coupled to rear fork 17. Each wheel 16 has a disc brake rotor 18 fixedly coupled thereto in a conventional manner.

The bicycle 10 and various components thereof are relatively conventional. Therefore, bicycle 10 and its various components will not be discussed or illustrated in detail herein, except as these components relate to front and rear disc brake assemblies 12 and 14 in accordance with the preferred embodiments of the present invention. Moreover, front and rear disc brake assemblies 12 and 14 are substantially identical. Therefore, only front disc brake assembly 12 will be discussed or illustrated in detail herein. However, it will be apparent to one skilled in the art from this disclosure that the descriptions of front disc brake assembly 12 also apply to rear disc brake assembly 14.

Figure 6:
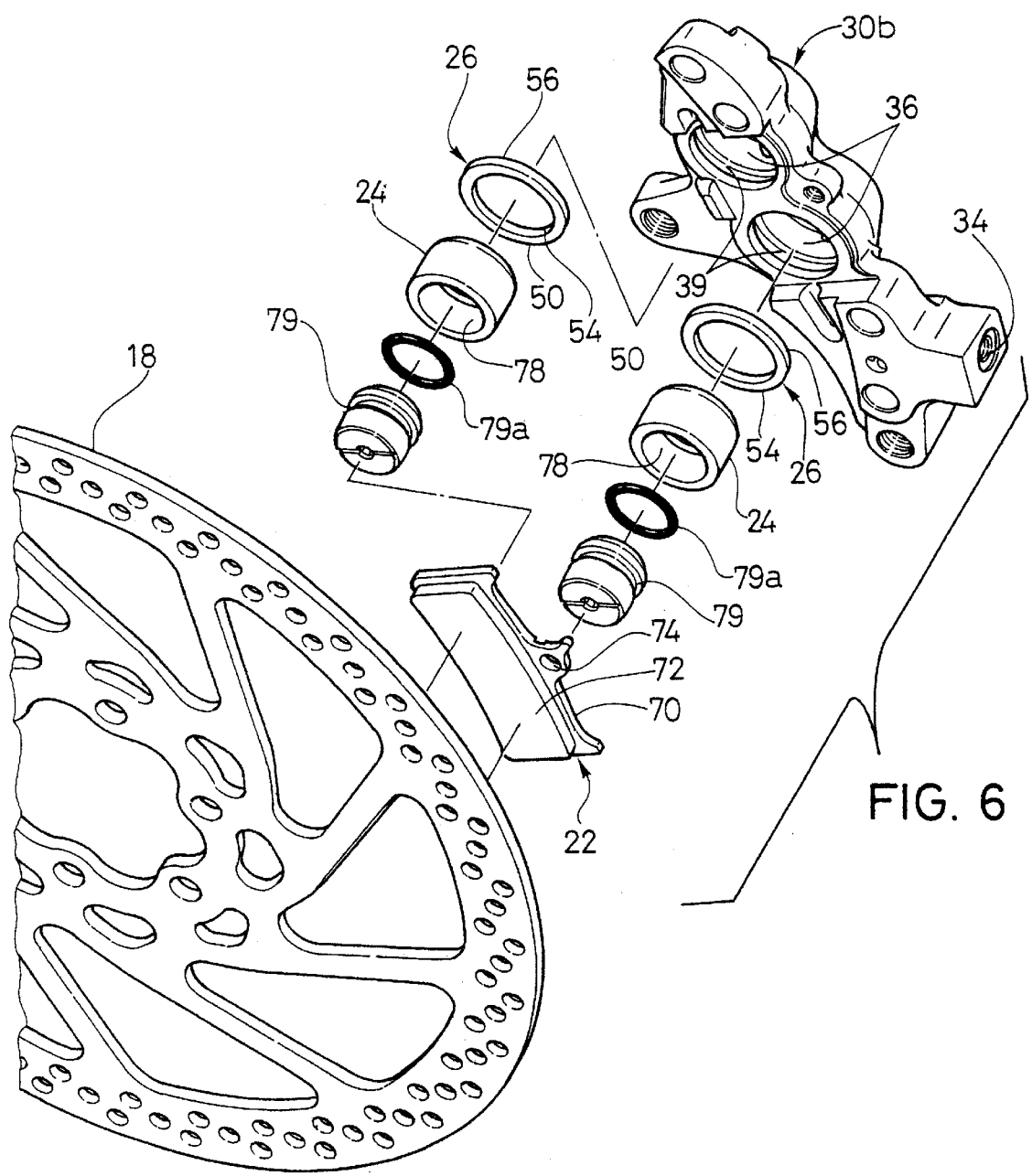
FIG. 6 is a partial exploded view of a portion of the front disc brake assembly illustrated in FIGS. 2 and 4.
Figure 7:
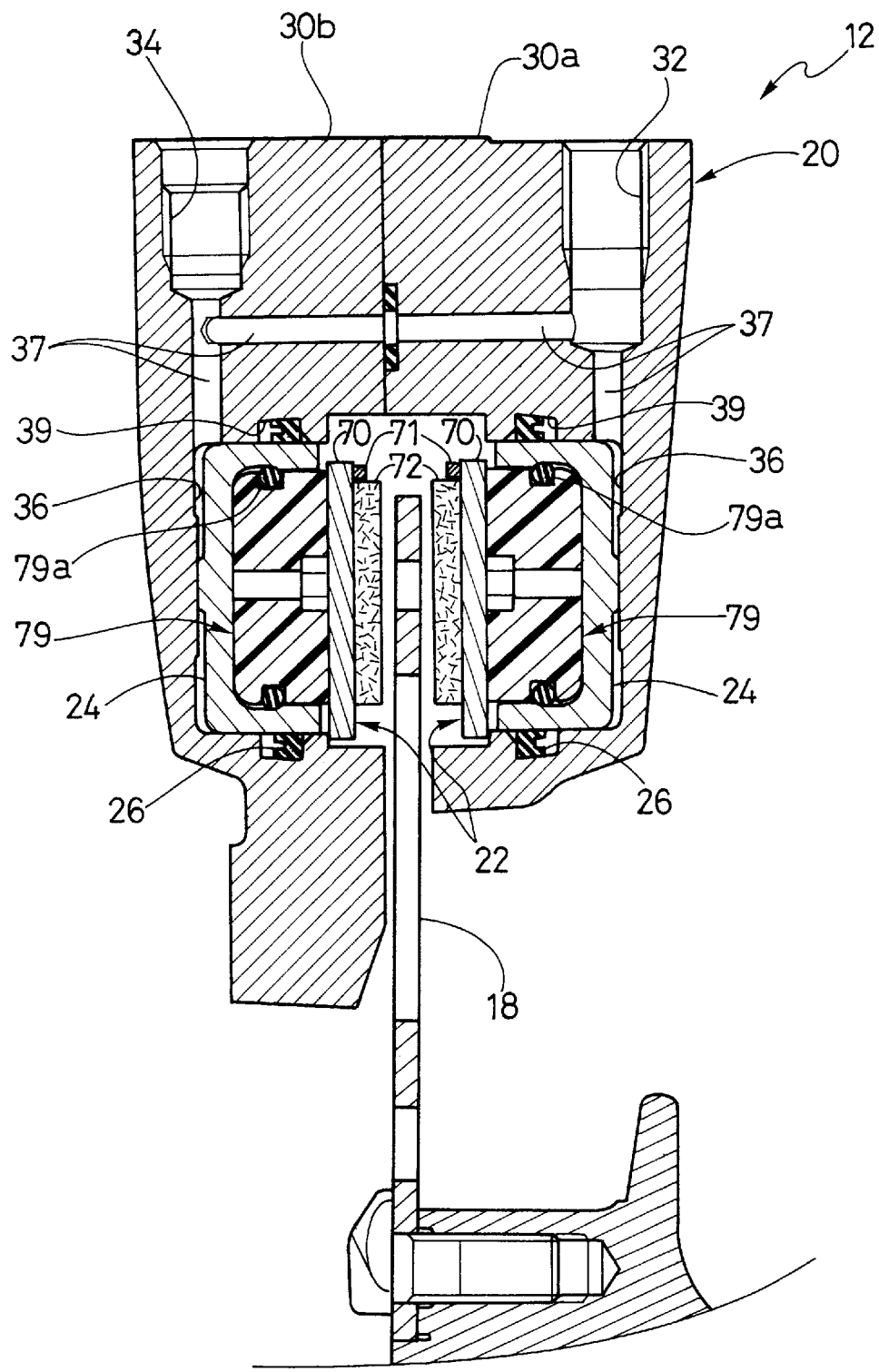
FIG. 7 is an enlarged, partial cross-sectional view of the front disc brake assembly illustrated in FIGS. 2, 4 and 6 as seen along section line 7—7 of FIG. 4 showing a roll back seal and a piston in a release position.
Figure 8:
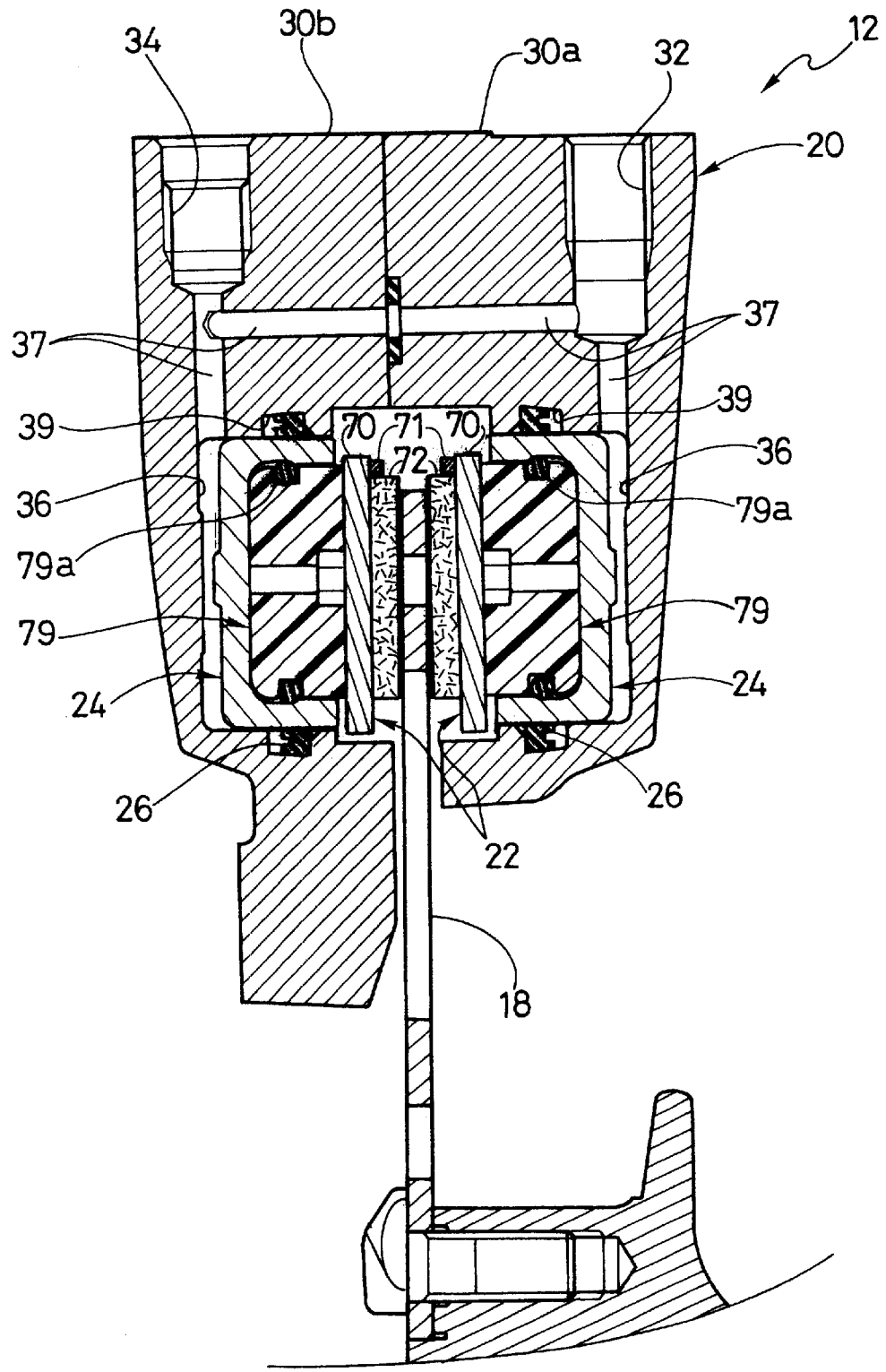
FIG. 8 is an enlarged, partial cross-sectional view of the front disc brake assembly illustrated in FIGS. 2, 4 and 6 as seen along section line 7—7 of FIG. 4 showing the roll back seal and the piston in a braking position.

As seen in FIGS. 6–8, front disc brake assembly 12 basically includes a caliper housing 20, a pair of friction members 22, a plurality of (four) pistons 24 and a plurality of (four) roll back seals 26. Front disc brake assembly 12 is operatively coupled to a brake operating mechanism 28a (shown in FIG. 2 and discussed in more detail below). Caliper housing 20 is fixedly coupled to front forks 15 in a conventional manner using threaded fasteners. First and second friction members 22 are coupled to caliper housing 20 to form a rotor receiving slot therebetween. At least one of the friction members 22 is movable relative to caliper housing 20, and preferably both friction members 22 are movable relative to caliper housing 20 as seen in FIGS. 7 and 8. At least one piston 24 is movably coupled to caliper housing 20. Preferably, each piston 24 is movably coupled to caliper housing 20. Roll back seals 26 are arranged between pistons 24 and caliper housing 20.

Referring to FIGS. 4 and 6–8, caliper housing 20 is preferably formed of rigid metallic material such as cast aluminum. Caliper housing 20 is formed from a first piston body portion 30a and a second piston body portion 30b. First and second piston body portions 30a and 30b are fixedly coupled together by a plurality of bolts. First piston body portion 30a has a fluid inlet opening or first threaded hole 32 formed therein for receiving a fluid coupling unit 33 (shown in FIG. 4). Second piston body portion 30b includes a second threaded hole 34 for receiving a bleed valve 35 (shown in FIG. 4). Caliper housing 20 preferably includes four ports or piston receiving openings 36 (only two shown).

More specifically, each of the first and second piston body portions 30a and 30b preferably has a pair of piston receiving openings 36 formed therein for receiving a pair of pistons 24 as seen in FIG. 6. Each pair of piston receiving openings 36 formed in one of piston body portions 30a or 30b is arranged to oppose the pair of piston receiving openings 36 formed in the other one of piston body portions 30a or 30b. Each pair of pistons 24 (i.e. mounted in one of the piston body portions 30a or 30b) is arranged to move one of the friction members 22 toward disc brake rotor 18.

Piston receiving openings 36 are in fluid communication with fluid coupling unit 33 and bleed valve 35 via a network of fluid conduits 37 as seen in FIGS. 7 and 8. Thus, when actuating fluid is supplied to caliper housing 20 through fluid coupling unit 33, the actuating fluid flows through the network of conduits 37 into the piston receiving openings 36. A portion of one of the conduits 37 acts as the fluid inlet opening of piston body portion 30a. Each piston receiving opening 36 is preferably an annular opening sized and configured to receive one of the pistons 24 therein.

Figures 13, 14:
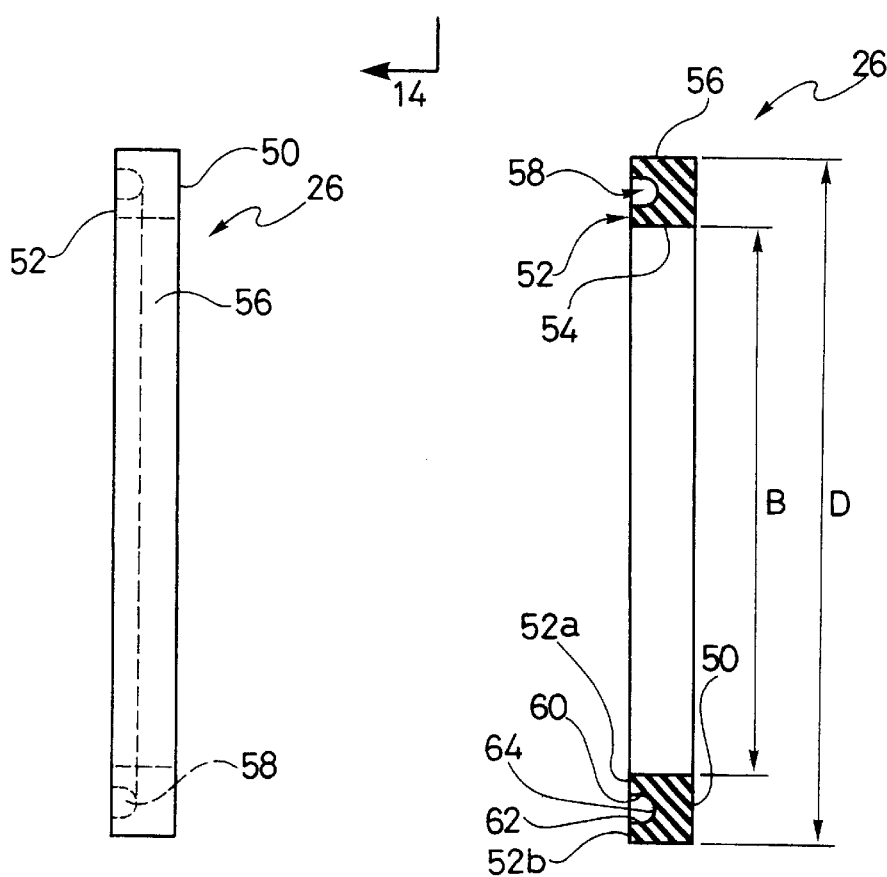
FIG. 13 is an end elevational view of the roll back seal illustrated in FIG. 12.
FIG. 14 is a cross-sectional view of the roll back seal illustrated in FIGS. 12 and 13 as seen along section line 14—14 in FIG. 12.
Figure 15:
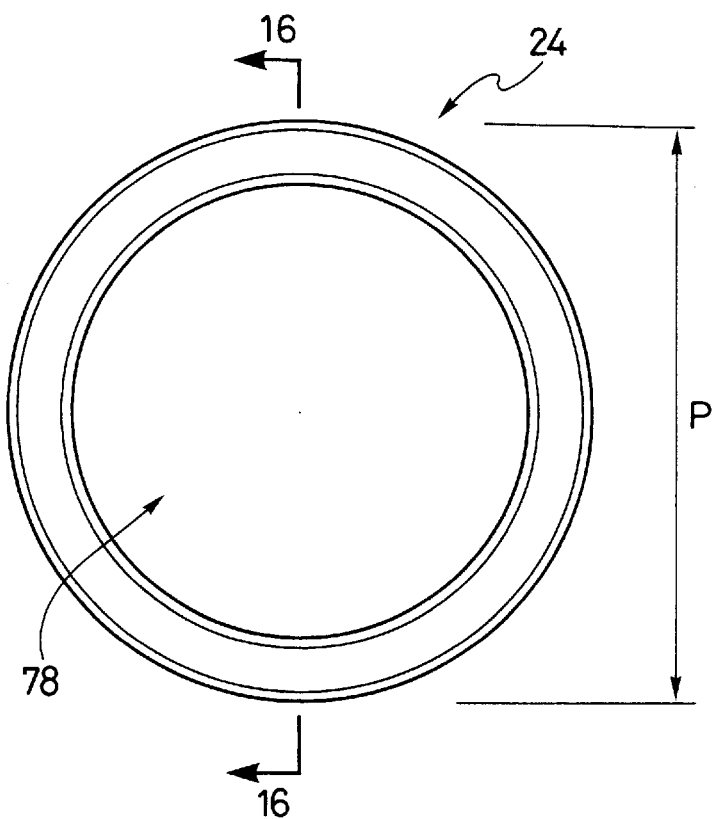
FIG. 15 is a side elevational view of one of the pistons of the front disc brake assembly illustrated in FIGS. 2, 4 and 6–11.
Figure 16:
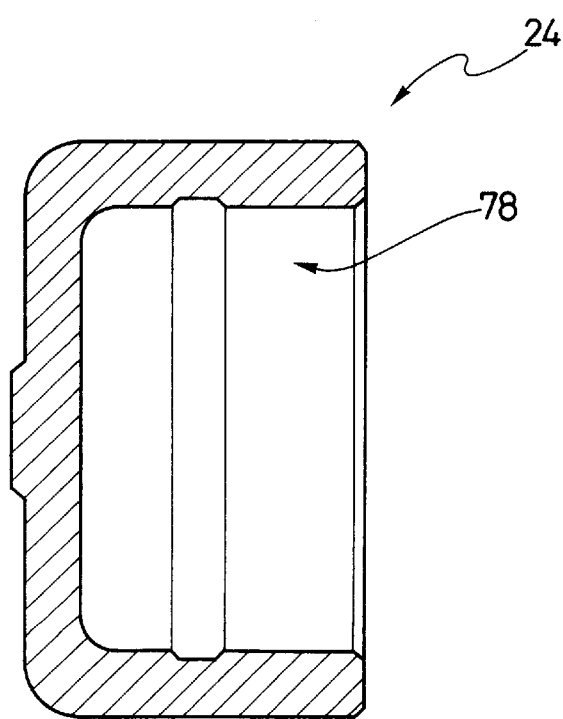
FIG. 16 is a cross-sectional view of the piston illustrated in FIG. 15 as seen along section line 16—16 in FIG. 15.
Figure 17:
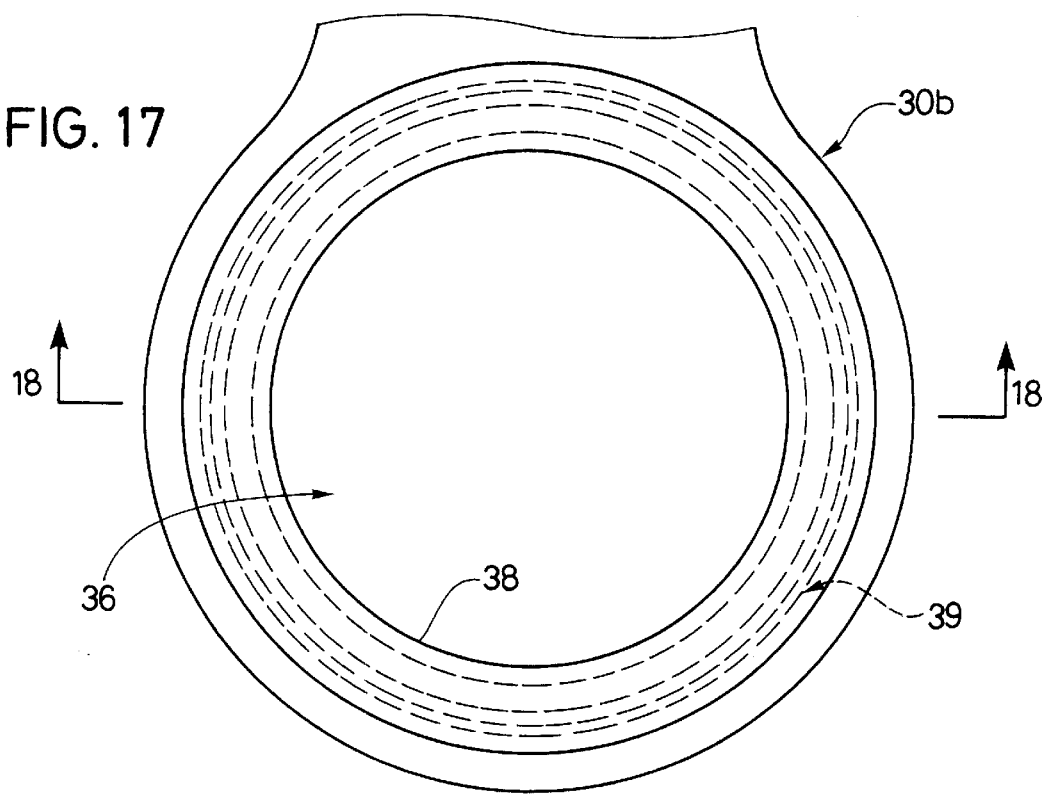
FIG. 17 is a partial, side elevational view of a portion of the caliper housing of the front disc brake assembly illustrated in FIGS. 2, 4 and 6–11.
Figure 18:
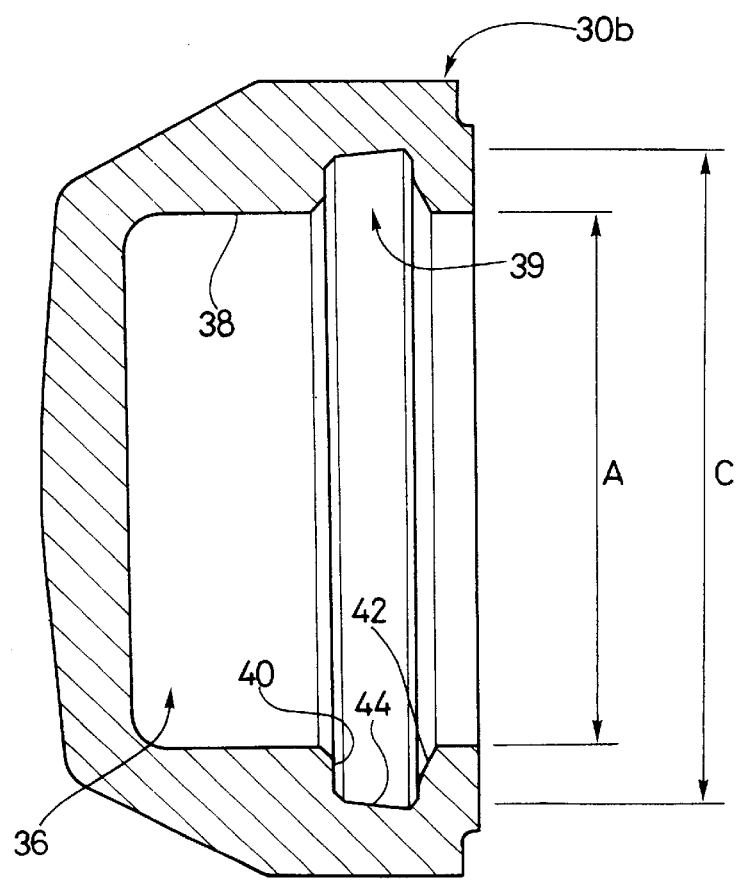
FIG. 18 is cross-sectional view of the portion of the housing illustrated in FIG. 17 as seen along section line 18—18 in FIG. 17.

As best seen in FIGS. 9–10 and 17–18, each piston receiving opening 36 has an annular side wall 38 with an annular groove 39 formed therein for receiving one of the roll back seals 26. Each piston receiving opening 36 has an open end facing one of the friction members 22. Grooves 39 are preferably adjacent the open ends of piston receiving openings 36. Each piston receiving opening 36 preferably has a minimum diameter A as seen in FIG. 18 (i.e. the minimum diameter of side wall 38) smaller than a minimum uninstalled diameter B of each roll back seal 26 as seen in FIG. 14. More specifically, uninstalled minimum diameter B is preferably about 0.2 mm larger than minimum diameter A. Additionally, minimum diameter A of each piston receiving opening 36 is preferably about 0.1 mm larger than an external diameter P of each piston 24.

Figure 11:
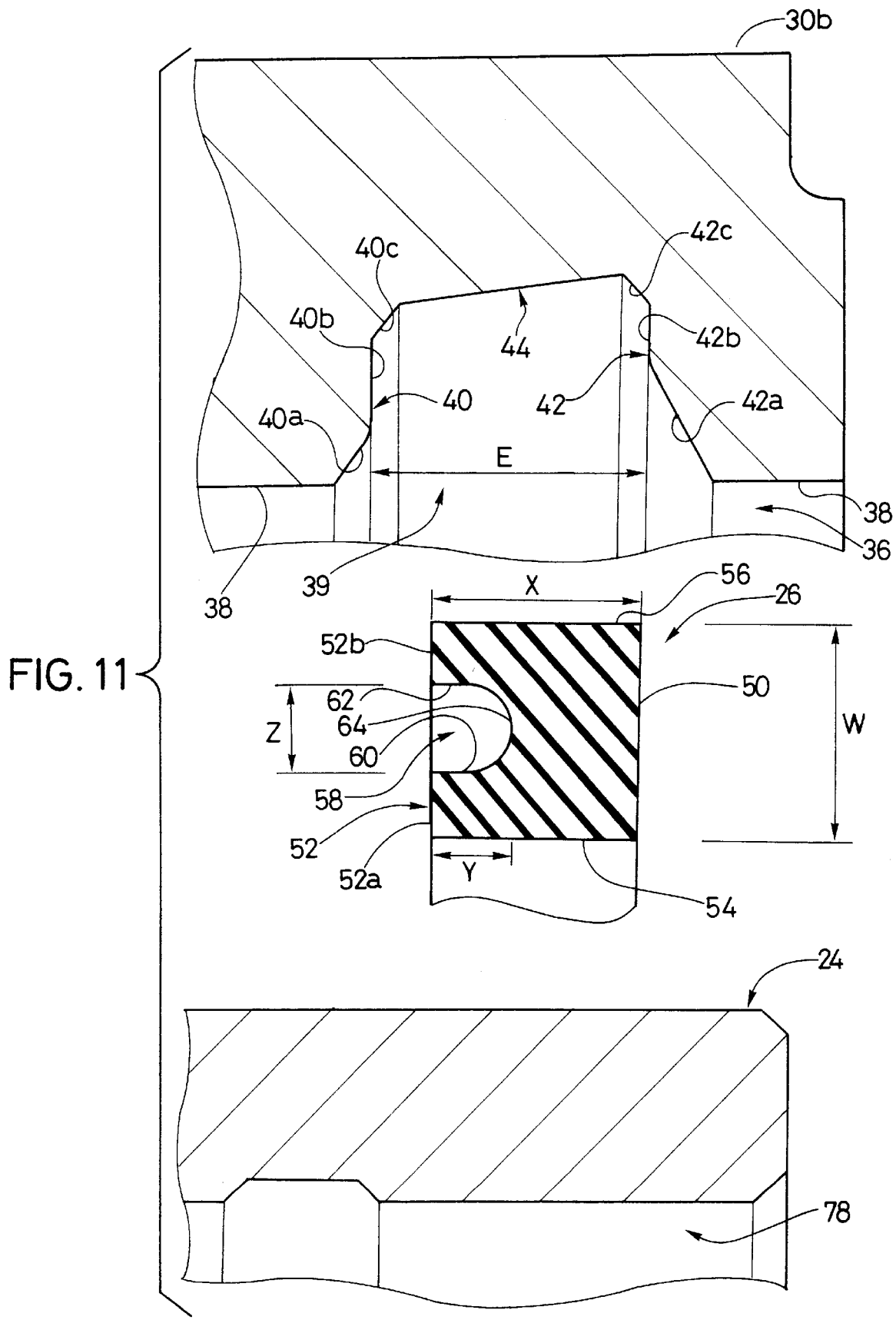
FIG. 11 is an enlarged, exploded, partial cross-sectional view of the caliper housing, piston and roll back seal illustrated in FIGS. 9 and 10.

As seen in FIGS. 11 and 18, each annular groove 39 basically includes an annular first interior end surface 40, an annular second interior end surface 42 and an annular contact surface 44. Interior end surface 42 is adjacent the open end of piston receiving opening 36 and spaced from interior end surface 40. Contact surface 44 extends between interior end surfaces 40 and 42. Contact surface 44 is a conical surface tapering radially outwardly toward the open end of piston receiving opening 36. Each groove 39 preferably has a maximum diameter C (i.e. maximum diameter of contact surface 44) smaller than a maximum uninstalled diameter D of each roll back seal 26 as seen in FIG. 14. More specifically, maximum uninstalled diameter D is preferably about 0.362 mm larger than maximum diameter C. Moreover, each groove 39 preferably has an axial length E larger than an axial length X of each roll back seal 26 and a maximum radial width of about 1.819 mm.

First interior end surface 40 includes an annular first tapered section 40*a*, an annular radial section 40*b* and an annular second tapered section 40*c* and second interior end surface 42 includes an annular first tapered section 42*a*, an annular radial section 42*b* and an annular second tapered section 42*c* as seen in FIG. 11. Radial sections 40*b* and 42*b* are preferably parallel to each other and axially spaced about 2.6 mm from each other. Additionally, radial sections 40*b* and 42*b* are preferably perpendicular to side wall 38. Radial section 40*b* has a larger radial width than radial section 42*b*. More specifically, axial length E of groove 39 is preferably measured between radial sections 40*b* and 42*b*. Contact surface 44 extends between tapered sections 40*c* and 42*c*.

Contact surface 44 is preferably angled about 6 degrees relative to side wall 38 and has an axial length of about 1.992 mm. Accordingly, contact surface 44 is preferably angled less than 90 degrees relative to radial section 42*b*. More specifically, contact surface 44 is preferably angled about 84 degrees relative to radial section 42*b*. Each second tapered section 40*c* and 42*c* preferably has an axial length of about 0.304 mm and forms a 135 degree angle with the respective radial sections 40*b* and 42*b*. Tapered section 40*a* is preferably angled about 225 degrees relative to side wall 38 and radial section 40*b*. Tapered section 42*a* is preferably angled about 243 degrees relative to side wall 38 and angled about 207 degrees relative to radial section 42*b*. Tapered section 42*a* preferably has an axial length of about 0.55 mm and a radial width of about 1.05 mm.

Figure 12:
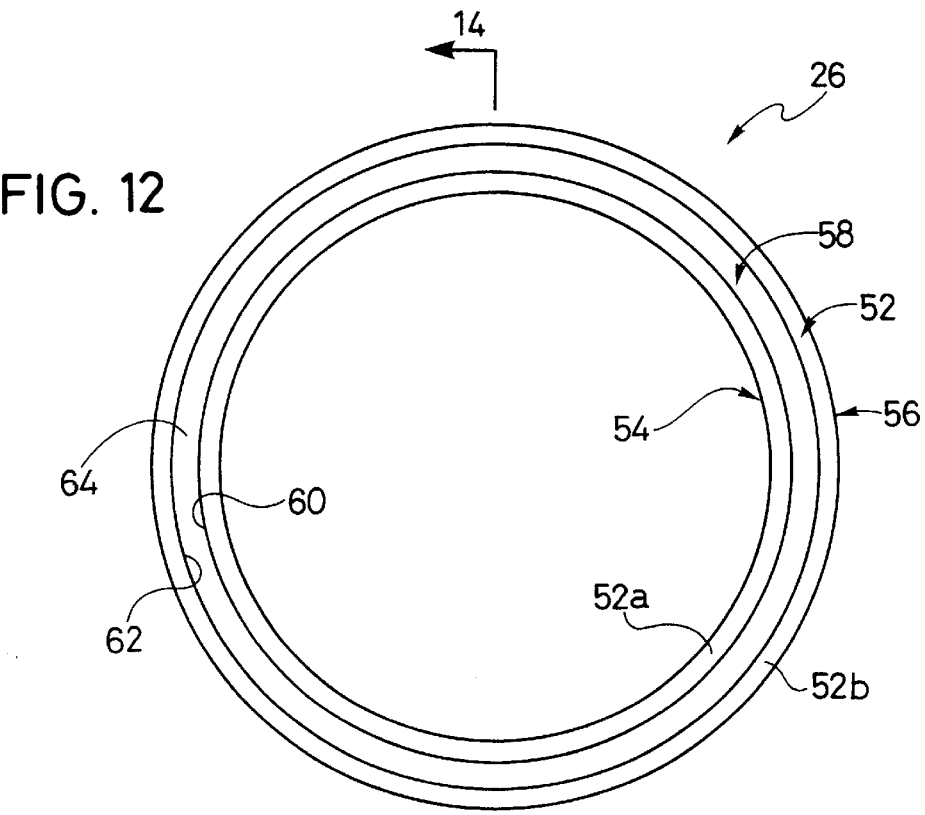
FIG. 12 is a side elevational view of one of the roll back seals of the front disc brake assembly illustrated in FIGS. 2, 4 and 6–11.

Referring to FIGS. 12–14, each roll back seal 26 is an annular member formed of a resilient material such as rubber or flexible plastic. More specifically, each roll back seal 26 is preferably formed of hydrogenated nitrile rubber with a hardness of about Hs 75. Moreover, each roll back seal 26 is preferably formed by injection molding as a one-piece unitary member. Of course it will be apparent to those skilled in the art from this disclosure that roll back seals 26 could be formed of alternate materials and/or manufacturing techniques as needed and/or desired.

Figure 9:
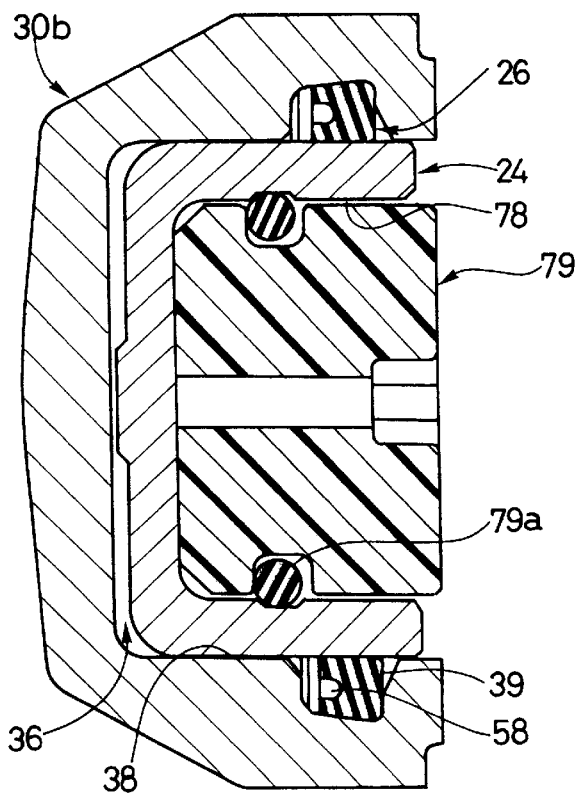
FIG. 9 is an enlarged cross-sectional view of a portion of the front disk brake assembly illustrated in FIG. 7 showing one of the pistons and one of the roll back seals in the release position.
Figure 10:
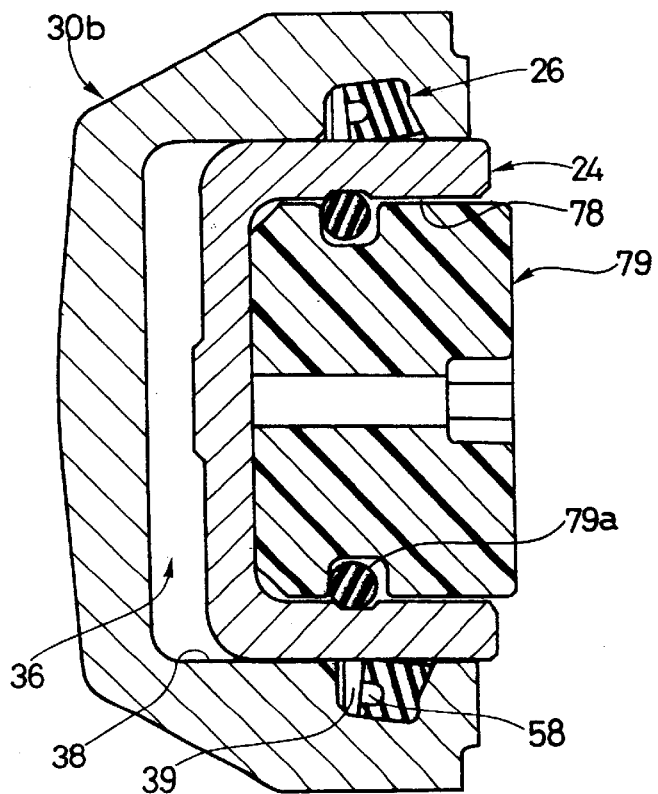
FIG. 10 is an enlarged cross-sectional view of a portion of the front disk brake assembly illustrated in FIG. 8 showing one of the pistons and one of the roll back seals in the braking position.

Each roll back seal 26 is located in one of the annular grooves 39 and acts to circumferentially seal the internal area of one of the piston receiving openings 36 from the outside of caliper housing 20 when pistons 24 are arranged in piston receiving openings 36 as best seen in FIGS. 9–10. Therefore, when actuating fluid is supplied to piston receiving openings 36, pistons 24 are moved toward rotor 18. Accordingly, friction members 22 are also moved toward disc brake rotor 18 to produce a stopping action on rotor 18, and therefore, wheel 16. Roll back seals 26 also act to bias pistons 24 toward the release position from the braking position. In other words, roll back seals 26 are elastically deformed when pistons 24 are moved to the braking position from the release position, and produce an elastic restoration force to move pistons 24 back to the release position when actuating fluid is drained from piston receiving openings 36.

As best seen in FIGS. 11–14, each roll back seal 26 basically includes a first annular end surface 50, a second annular end surface 52, an inner annular sealing surface 54 and an outer annular sealing surface 56. Second annular end surface 52 is spaced from first annular end surface 50. Inner and outer annular sealing surfaces 54 and 56 extend between first annular end surface 50 and second annular end surface 52. Second annular end surface 52 has an annular recess 58 formed therein.

Inner and outer sealing surfaces 54 and 56 are preferably substantially parallel to each other and spaced about 1.9 mm apart from each other prior to installation of roll back seal 26 in groove 39. This space is considered a maximum uninstalled radial width W of roll back seal 26. Additionally, first and second end surfaces 50 and 52 are also preferably substantially parallel and spaced about 1.9 mm apart from each other prior to installation of roll back seal 26 in groove 39. This space is considered a maximum uninstalled axial length X of roll back seal 26. First and second end surfaces 50 and 52 also preferably form 90 degree angles relative to inner and outer sealing surfaces 54 and 56 prior to installation of roll back seal 26 in groove 39. Accordingly, roll back seal 26 has a partially square cross-sectional shape prior to installation of roll back seal 26 in groove 39.

As mentioned above, each of the roll back seals 26 has a maximum uninstalled diameter D larger than the maximum diameter C of groove 39 and a minimum uninstalled diameter B larger than the minimum diameter of piston receiving opening 36 as seen in FIGS. 14 and 18. Accordingly, roll back seals 26 are deformed when installed in grooves 39 as seen in FIGS. 9–10. More specifically, annular contact surface 44 contacts outer sealing surface 56 when roll back seal 26 is installed in groove 39. Therefore, inner and outer sealing surfaces 54 and 56 are substantially parallel prior to installation but outer seal surface 56 is deformed to be non-parallel to inner sealing surface 54 upon installation of roll back seal 26 between piston body portion 30*b* and piston 24.

Referring again to FIG. 11, annular recess 58 basically includes a first annular interior surface 60, a second annular interior surface 62 and a curved annular interior surface 64. Second annular interior surface 62 is spaced from first annular interior surface 60. First and second annular interior surfaces 60 and 62 are preferably substantially parallel to each other. Curved interior surface 64 connects first and second interior surfaces 62 and 64. Curved interior surface 64 is preferably a concave surface with a semicircular cross-section and a radius equal to one half of the radial width of recess 58. In other words, recess 58 has a substantially U-shaped cross-section with an open end adjacent second end surface 52. Moreover, the open end of recess 58 faces first end surface 40 of groove 39 when roll back seal 26 is installed in groove 39.

More specifically, each recess 58 has an axial length Y and a radial width Z. The radial width Z of recess 58 is preferably larger than the axial length Y of recess 58. The axial length Y of recess 58 consists of the axial length of interior surfaces 60/62 and the axial length of curved interior surface 64. Preferably, each of the interior surfaces 60 and 62 has an axial length smaller than the axial length of curved interior surface 64. More specifically, each of the interior surfaces preferably has an axial length of about 0.3 mm and curved interior surface 64 preferably has an axial length of about 0.4 mm. Accordingly, recess 58 preferably has an axial length Y of about 0.7 mm and a radial width Z of about 0.8 mm.

In any case, recess 58 preferably has a radial width Z of about 42.1% of the maximum uninstalled radial width W of roll back seal 26 and an axial length Y of about 36.8% of the maximum uninstalled axial length X of roll back seal 26. Furthermore, recess 58 is preferably radially centered relative to inner and outer sealing surfaces 54 and 56 to divide end surface 52 into a radially inner section 52*a* and a radially outer section 52*b* prior to installation of roll back seal 26 in groove 39. Accordingly, radially inner section 52*a* preferably has a radial width equal to a radial width of radially outer section 52b prior to installation of roll back seal 26 in groove 39. Each of the radially inner and outer sections 52a and 52b preferably has a radial width of about 28.9% of the maximum uninstalled radial width W of roll back seal 26. In other words, each of the radially inner and outer sections 52a and 52b preferably has an uninstalled radial width of about 0.55 mm.

Referring again to FIGS. 4 and 6–8, preferably two friction members 22 are movably coupled to caliper housing 20 such that a rotor receiving slot is formed therebetween, as discussed above. Each friction member 22 basically includes a plate 70 with a friction material 72 fixedly coupled thereto in a conventional manner. Each plate is preferably formed of a rigid metallic material in a conventional manner. Each plate 70 includes a mounting hole 74 for slidably receiving a mounting pin 76 therethrough. Mounting pin 76 is partially threaded at one end and receives a securing member 77 on the opposite end to secure friction members 22 to caliper housing 20 in a conventional manner.

A spring plate or pad spring 71 is arranged between friction members 22 to bias friction members 22 away from each other as shown in FIGS. 7–8. The pad spring 71 contacts each of the plates 70. Therefore, when actuating fluid is drained from piston receiving openings 36, the pad spring 71 acts to return friction members 22 to a release position from a braking position and roll back seals 26 acts to return pistons 24 to a release position from a braking position. Accordingly, reliable movement of pistons 24 and friction members 22 can be achieved.

Referring now to FIGS. 9–11 and 15–16, each piston 24 is preferably an annular member formed of rigid metallic material, such as cast aluminum. Each piston 24 is preferably movably coupled to caliper housing 20 to move one of the friction members 22 under pressure from the actuating fluid between a release position and a braking position. Roll back seals 26 frictionally retain pistons 24 in piston receiving openings 36.

More specifically, each of the pistons 24 has an external diameter P about 0.1 mm smaller than minimum diameter A of each piston receiving opening 36. Each roll back seal 26 is deformed to extend beyond groove 39 into one of the piston receiving openings 36 and contact one of the pistons 24 to retain the piston 24 in piston receiving opening 36. Movement of the pistons 24 from the release position to the braking position is caused by supplying actuating fluid to the piston receiving openings 36, as discussed above. Pistons 24 are returned to the release position from the braking position by roll back seals 26 when actuating fluid is drained from receiving openings 36.

Preferably, each piston 24 has an external diameter P of about 15.4 mm. Accordingly, the dimensions of other parts (i.e. roll back seals 26, piston receiving openings 36 and grooves 39) of disc brake assembly 12 are sized and configured according to the dimensional relationships described above. Of course, it will be apparent to those skilled in the art from this disclosure that pistons 24 could be larger and/or smaller as needed and/or desired. For example, alternatively, each piston could have an external diameter P of about 13.5 mm if needed and/or desired. In any case, regardless of the dimensions of pistons 24, the dimensional relationships described above are preferably maintained.

As best seen in FIGS. 9–10 and 15–16, each piston 24 preferably includes an internal recess 78 facing towards one of the respective friction members 22. Each internal recess 78 includes an end wall and a side wall. Preferably, each internal recess 78 is an annular recess with an annular retaining groove formed in the side wall. Each internal recess 78 is preferably sized and configured to receive a heat insulator 79 therein. Each heat insulator 79 is retained in one of the recesses 78 by a retaining ring 79a.

Each heat insulator 79 is preferably an annular member formed of a material with a low heat transfer coefficient such as plastic. Moreover, each heat insulator 79 is disposed between one of the friction members 22 and one of the pistons 24 to dissipate the heat transferred from friction members 22 to other parts of disc brake assembly 12. Accordingly, heat transferred to the actuating fluid can also be dissipated. Heat insulators 79 are relatively conventional. Accordingly, heat insulators 79 will not be discussed or illustrated in detail herein.

Referring again to FIGS. 1–3, a pair of brake operating mechanisms 28a and 28b are illustrated and are conventional disc brake operating mechanisms. Therefore, brake operating mechanisms 28a and 28b will not be discussed or illustrated in detail herein. Brake operating mechanisms 28a and 28b are provided to control disc brake assemblies 12 and 14. Brake operating mechanisms 28a and 28b are preferably fixedly mounted on handle bar 19 adjacent the hand portions of handle bar 19. Accordingly, brake operating mechanisms 28a and 28b are operated in a conventional manner such that disc brake assemblies 12 and 14 move friction members 22 from a release position in which bicycle wheels 16 and the disc brake rotors 18 are free to rotate, and a braking position. In the braking position, disc brake assemblies 12 and 14 apply a braking force against disc brake rotor 18 to stop rotation of bicycle wheels 16 and disc brake rotors 18.

Brake operating mechanisms 28a and 28b will now be described in more detail. Basically, brake operating mechanisms 28a and 28b are designed to actuate the disc brake assemblies 12 and 14 in a conventional manner to apply a forcible gripping action on disc brake rotor 18 to stop rotation of one of the front wheels 16. Brake operating mechanism 28b actuates rear disc brake assembly 14 and brake operating mechanism 28a actuates front disc brake assembly 12. Brake operating mechanism 28b is identical to brake operating mechanism 28a except brake operating mechanism 28b is a mirror image of brake operating mechanism 28a. Each of the brake operating mechanisms 28a and 28b basically includes a brake lever 80, a hydraulic or master cylinder 81, a hydraulic or master piston 82, and an actuation fluid reservoir 83. Preferably, each of the brake operating mechanisms 28a and 28b is a single unit, which is mounted on handlebar 19.

In particular, referring to either one of the brake operating mechanisms 28a and 28b, brake lever 80 includes a mounting portion 84 and a lever portion 85. Mounting portion 84 is designed to be clamped onto handle bar 19 in a conventional manner. Mounting portion 84 is integrally formed with master cylinder 81 such that master cylinder 81, master piston 82 and actuation fluid reservoir 83 are all supported on mounting portion 84 of brake lever 80. Lever portion 85 is pivotally coupled to mounting portion 84 for movement between a release position and a braking position. Normally, lever portion 84 is maintained in a release position in a conventional manner.

Master piston 82 is movably mounted within master cylinder 81 in a conventional manner. More specifically, actuation fluid reservoir 83 is mounted on master cylinder 81 and is in fluid communication with the interior bore of master cylinder 81 for supplying actuation fluid thereto. Master piston 82 is connected at one end to lever portion 85 for axially moving master piston 82 within master cylinder 81. Accordingly, actuation of lever portion 85 causes master piston 82 to move axially within master cylinder 81. This movement of master piston 82 within master cylinder 81 directs fluid pressure through a hydraulic line 86 which is coupled to one of the disc brake assemblies 12 and 14 via fluid coupling units 33. Thus, the pressurized actuating fluid causes the pistons 24 and friction members 22 to move so as to engage disc brake rotors 18 to stop rotation of wheels 16.

The terms of degree such as "substantially", "about" and "approximately" as used herein mean a reasonable amount of deviation of the modified term such that the end result is not significantly changed. These terms should be construed as including a deviation of ±25% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A roll back seal for a fluid operated disc brake assembly comprising:
   a first annular end surface;
   a second annular end surface spaced from said first end surface, said second end surface having an annular recess formed therein;
   an inner annular sealing surface extending between said first end surface and said second end surface; and
   an outer annular sealing surface extending between said first end surface and said second end surface,
   said recess having a maximum axial length of about 36.8% of a maximum axial length of said roll back seal, and said recess having a maximum radial width of about 42.1% of a maximum radial width of said roll back seal.

2. The roll back seal according to claim 1, wherein
   said annular recess includes a first annular interior surface, a second annular interior surface spaced from said first interior surface and a curved annular interior surface connecting said first and second interior surfaces.

3. The roll back seal according to claim 2, wherein
   said first and second interior surfaces are substantially parallel.

4. The roll back seal according to claim 3, wherein
   said curved interior surface is a concave surface with a semicircular cross-section.

5. The roll back seal according to claim 3, wherein
   said first and second interior surfaces each have an axial length smaller than an axial length of said curved interior surface.

6. The roll back seal according to claim 1, wherein
   said roll back seal is formed as a one-piece unitary member.

7. The roll back seal according to claim 1, wherein
   said roll back seal is formed of hydrogenated nitrile rubber.

8. The roll back seal according to claim 1, wherein
   said inner and outer sealing surfaces are substantially parallel.

9. The roll back seal according to claim 1, wherein
   said maximum radial width of said recess is larger than said maximum axial length of said recess.

10. The roll back seal according to claim 9, wherein
    said maximum radial width of said recess is about 0.8 mm and said maximum axial length of said recess is about 0.7 mm.

11. The roll back seal according to claim 1, wherein
    said annular recess is radially centered relative to said inner and outer annular sealing surfaces to divide said second annular end surface into a radially inner section and a radially outer section.

12. A roll back seal for a fluid operated disc brake assembly comprising:
    a first annular end surface;
    a second annular end surface spaced from said first end surface, said second end surface having an annular recess formed therein;
    an inner annular sealing surface extending between said first end surface and said second end surface; and
    an outer annular sealing surface extending between said first end surface and said second end surface,
    said annular recess including a first annular interior surface, a second annular interior surface spaced from said first interior surface and a curved annular interior surface connecting said first and second interior surfaces, said first and second interior surfaces being substantially parallel,
    said annular recess having a maximum axial length and a maximum radial width larger than said maximum axial length.

13. The roll back seal according to claim 12, wherein
    said maximum radial width of said recess is about 0.8 mm and said maximum axial length of said recess is about 0.7 mm.

14. The roll back seal according to claim 12, wherein
    said curved interior surface is a concave surface with a semicircular cross-section.

15. The roll back seal according to claim 12, wherein
    said maximum axial length of said recess is about 36.8% of a maximum axial length of said roll back seal.

16. The roll back seal according to claim 12, wherein
    said maximum radial width of said recess is about 42.1% of a maximum radial width of said roll back seal.

17. A disc brake assembly comprising:
    a caliper housing with a piston receiving opening, said piston receiving opening having an annular side wall with an annular groove formed therein;
    a first and a second friction member coupled to said caliper housing to form a rotor receiving slot between said first and second friction members with at least said first friction member being movably coupled to said caliper housing;
    a piston movably coupled in said piston receiving opening of said caliper housing to move said first friction member between a release position and a braking position; and
    an annular roll back seal located in said annular groove between said caliper housing and said piston, said roll back seal having first and second annular end surfaces and inner and outer annular sealing surfaces extending between said first end surface and said second end surface, said second end surface having an annular recess formed therein, said recess having a maximum axial length of about 36.8% of a maximum axial length of said roll back seal, and said recess having a maximum radial width of about 42.1% of a maximum uninstalled radial width of said roll back seal.

18. The disc brake assembly according to claim 17, wherein said annular recess includes a first annular interior surface, a second annular interior surface spaced from said first interior surface and a curved annular interior surface connecting said first and second interior surfaces.

19. The disc brake assembly according to claim 18, wherein said first and second interior surfaces are substantially parallel.

20. The disc brake assembly according to claim 19, wherein said curved interior surface is a concave surface with a semicircular cross-section.

21. The disc brake assembly according to claim 19, wherein said first and second interior surfaces each have an axial length smaller than an axial length of said curved interior surface.

22. The disc brake assembly according to claim 17, wherein said annular groove has an annular contact surface that contacts said outer sealing surface, said inner and outer sealing surfaces are substantially parallel prior to installation but said outer seal surface is deformed to be non-parallel to said inner sealing surface upon installation of said roll back seal between said caliper housing and said piston.

23. The disc brake assembly according to claim 17, wherein said maximum radial width of said recess is larger than said maximum axial length of said recess.

24. The disc brake assembly according to claim 23, wherein said maximum radial width of said recess is about 0.8 mm and said maximum axial length of said recess is about 0.7 mm.

25. The disc brake assembly according to claim 17, wherein said annular recess is radially centered relative to said inner and outer annular sealing surfaces to divide said second annular end surface into a radially inner section and a radially outer section prior to installation of said roll back seal in said groove.

26. The disc brake assembly according to claim 17, wherein said roll back seal is formed as a one-piece unitary member.

27. The disc brake assembly according to claim 17, wherein said roll back seal is formed of hydrogenated nitrile rubber.

28. The disc brake assembly according to claim 17, wherein said roll back seal has a maximum uninstalled diameter and said groove has a maximum diameter smaller than said maximum uninstalled diameter of said roll back seal.

29. The disc brake assembly according to claim 28, wherein said roll back seal has a minimum uninstalled diameter and said piston receiving opening has a minimum diameter smaller than said minimum uninstalled diameter of said roll back seal.

30. The disc brake assembly according to claim 29, wherein said annular groove has an annular contact surface that contacts said outer sealing surface, said inner and outer sealing surfaces are substantially parallel prior to installation but said outer seal surface is deformed to be non-parallel to said inner sealing surface upon installation of said roll back seal between said caliper housing and said piston.

31. The disc brake assembly according to claim 17, wherein said annular groove has an axial length larger than an axial length of said roll back seal.

32. A disc brake assembly comprising:

a caliper housing with a piston receiving opening, said piston receiving opening having an annular side wall with an annular groove formed therein;

a first and a second friction member coupled to said caliper housing to form a rotor receiving slot between said first and second friction members with at least said first friction member being movably coupled to said caliper housing;

a piston movably coupled in said piston receiving opening of said caliper housing to move said first friction member between a release position and a braking position; and an annular roll back seal located in said annular groove between said caliper housing and said piston, said roll back seal having first and second annular end surfaces and inner and outer annular sealing surfaces extending between said first end surface and said second end surface, said second end surface having an annular recess formed therein, said annular recess including a first annular interior surface, a second annular interior surface spaced from said first interior surface and a curved annular interior surface connecting said first and second interior surfaces, said first and second interior surfaces being substantially parallel, said annular recess having a maximum axial length and a maximum radial width larger than said maximum axial length.

33. The disc brake assembly according to claim 32, wherein said maximum radial width of said recess is about 42.1% of a maximum uninstalled radial width of said roll back seal.

34. The disc brake assembly according to claim 32, wherein said maximum radial width of said recess is about 0.8 mm and said maximum axial length of said recess is about 0.7 mm.

35. The disc brake assembly according to claim 32, wherein said maximum axial length of said recess is about 36.8% of a maximum axial length of said roll back seal.

36. The disc brake assembly according to claim 32, wherein said curved interior surface is a concave surface with a semicircular cross-section.

37. A caliper housing for a disc brake assembly comprising:
- a fluid inlet opening formed in said housing; and
- a piston body portion with a piston receiving opening formed therein and a fluid conduit in fluid communication with said fluid inlet opening and said piston receiving opening;
- said piston receiving opening having an annular side wall with an annular groove formed therein adjacent an open end of said piston receiving opening, said groove having a first annular end surface, a second annular end surface spaced from said first end surface and an annular contact surface extending between said first and second end surfaces, said second end surface being adjacent said open end and having an annular first tapered section and an annular radial section forming an angle of about 207 degrees therebetween, said contact surface forming an angle of less than 90 degrees with said radial section,
- said groove having a maximum radial width and said first tapered section having a maximum radial width larger than half of said maximum radial width of said groove.

38. The caliper housing according to claim 37, wherein said first tapered section extends between said side wall and said radial section and forms an angle of about 243 degrees with said side wall.

39. The caliper housing according to claim 37, wherein said second end surface has an annular second tapered section extending between said radial section and said contact surface.

40. The caliper housing according to claim 37, wherein said contact surface is angled about 84 degrees relative to said radial section.

41. The caliper housing according to claim 37, wherein said first tapered section has an axial length of about 0.55 millimeters and a radial width of about 1.05 millimeters.

42. The caliper housing according to claim 37, wherein said first end surface includes an annular radial section and an annular tapered section extending between said side wall and said radial section of said first end surface.

43. The caliper housing according to claim 42, wherein said radial section of said first end surface is spaced about 2.6 millimeters from said radial section of said second end surface.

44. The caliper housing according to claim 37, wherein said groove has an annular roll back seal located therein.

45. The caliper housing according to claim 44, wherein said roll back seal includes an annular recess formed therein, said recess having a substantially U-shaped cross-section with an open end facing said first end surface of said groove.

46. The caliper housing according to claim 45, wherein said roll back seal has a maximum uninstalled diameter and said groove has a maximum diameter smaller than said maximum uninstalled diameter of said roll back seal.

* * * * *